United States Patent [19]
Matsuoka

[11] Patent Number: 5,936,379
[45] Date of Patent: Aug. 10, 1999

[54] POWER STEERING APPARATUS HAVING COMPENSATION FOR DELAY OF OIL PRESSURE BUILD-UP

[75] Inventor: Hirofumi Matsuoka, Souraku-gun, Japan

[73] Assignee: Koyo Seiko Co., Ltd., Osaka, Japan

[21] Appl. No.: 08/797,937

[22] Filed: Feb. 12, 1997

[30] Foreign Application Priority Data

Feb. 20, 1996 [JP] Japan .................................. 8-032123

[51] Int. Cl.$^6$ ...................................................... H02P 7/36
[52] U.S. Cl. .......................................... 318/810; 180/422
[58] Field of Search ................................... 318/744–815, 318/280–286, 432; 180/132, 133, 135, 139, 142, 143, 152, 79.1, 417, 419, 421, 422, 423

[56] References Cited

U.S. PATENT DOCUMENTS

| | | | |
|---|---|---|---|
| 3,991,846 | 11/1976 | Chichester | 180/132 |
| 4,392,540 | 7/1983 | Michio et al. | 180/142 |
| 4,602,695 | 7/1986 | Takeshima et al. | 180/422 |
| 4,828,066 | 5/1989 | Hayashi | 180/142 |
| 5,307,892 | 5/1994 | Phillips | 180/422 |
| 5,367,235 | 11/1994 | Fukudome | 318/286 |
| 5,761,627 | 6/1998 | Seidel et al. | 180/443 |

FOREIGN PATENT DOCUMENTS

| | | |
|---|---|---|
| 053 297 | 9/1982 | European Pat. Off. . |
| 534 332 | 3/1993 | European Pat. Off. . |

*Primary Examiner*—Jonathan Salata
*Attorney, Agent, or Firm*—Darby & Darby

[57] ABSTRACT

A power steering apparatus has a flow amount detecting sensor for detecting an actuating oil flow amount on the exit side of an actuator operated by an actuating oil pressure generated by a hydraulic pump, and a control circuit for controlling the rotation of the motor for driving the hydraulic pump. The power steering apparatus has a flow amount variation detecting sensor for detecting a variation amount of an actuating oil flow amount on the exit side of the actuator and a control circuit for controlling the motor rotation on the basis of the variation amount. This is to compensate for the decrease in the flow of oil to the actuator caused by an expansion of a hose between the pump and the actuator.

8 Claims, 7 Drawing Sheets

5,936,379

POWER STEERING APPARATUS HAVING COMPENSATION FOR DELAY OF OIL PRESSURE BUILD-UP

BACKGROUND OF THE INVENTION

The present invention relates to improvement of a power steering apparatus for assisting steerage by using actuators such as hydraulic cylinder, hydraulic motor, and the like, as a generation source of the hydraulic power for the hydraulic pump to be driven by rotation of an electric motor.

FIG. 1 is a block diagram showing an essential constitution of a conventional power steering apparatus for assisting steerage by an actuator using a hydraulic pump rotationally driven by an electric motor as a generation source of the actuating oil pressure. In this power steering apparatus an electric motor 4 is driven by a voltage applied by a motor driving circuit 2 according to a target value of the applied voltage indicated by a target determining unit 1c. The electric motor 4 rotationally drives a hydraulic pump 5 to generate the actuating oil pressure. The control valve 6 controls the pressure of the actuating oil to be sent under pressure to the pipelines 6a and 6b which are led to a hydraulic cylinder.

When the steering wheel 7 is manipulated to operate the gear apparatus including the pinion gear 6c provided at the lower end of the steering shaft, the control valve 6 controls the pressure of the actuating oil to be sent under pressure to the pipelines 6a, 6b led to the hydraulic cylinder. By this step, the hydraulic cylinder is operated to generate the steering assistant force proportionate to the operating amount in the direction of the operation of the steering wheel 7.

The actuating oil circulates in the hydraulic circuit constituted by the hydraulic pump 5, control valve 6, hydraulic cylinder and oil supply tank 5a, etc.

To the motor driving circuit 2 there is connected a motor current detecting circuit 3 for detecting the current led to the electric motor 4, and the motor current detecting signal is inputted to the no-load current detecting unit 1a and the operator 1b. The no-load current detecting unit 1a detects to hold the motor current detection signal in no-load time in consideration of the motor current which varies depending on the oil temperature. The operator 1b deducts the signal from the motor current detection circuit 3 by the signal from the no-load current detecting unit 1a and inputs the variation amount of the motor current detection signal to the target determining unit 1c. The target determining unit 1c is to control, by the amount of variation of the motor current detection signal, the voltage to be applied to the electric motor 4 by switching to high or low level according to the amount of variation of the motor current detection signal.

According to the conventional power steering apparatus having the constitution as described above, when the steering wheel 7 is not operated and no steering assistant force is required (the current running to the motor 4 is small), the target determining unit 1c reduces the voltage to be applied to the electric motor 4 by one step to decrease the output of the electric motor 4, as shown in FIG. 2. And, when the steering wheel 7 is manipulated to operate the control valve 6, the actuating oil pressure rises to increase the load and the current running in the electric motor 4. When the variation amount of the motor current detecting signal outputted by the operator 1b reaches the predetermined amount, the target determining unit 1c increases the voltage to be applied to the electric motor 4 by one step to increase the output of the electric motor 4, thereby increasing the steering assistant force.

However, in the conventional power steering apparatus, when, as described above, the steering wheel 7 is manipulated to close the control valve 6 as shown in FIG. 3A and the actuating oil pressure starts to rise, the hose lying between the hydraulic pump 5 and the control valve 6 starts to expand its volume due to its elasticity. Consequently, although the discharging amount of the hydraulic pump 5 does not show change (FIG. 3B), the exit flow amount of the control valve 6 (exit flow amount of the actuator) decreases as shown in FIG. 3C–A, during the expansion of the inner volume of the hose (e.g., about 0.2 second), and the rise of the actuating oil pressure on the high pressure side of the control valve 6 (actuating oil pressure on the entrance side) becomes slow as shown in FIG. 3 D–B.

For example, assuming the hose swelling amount to be 10 cm$^3$/m, the pump delivery amount to be 2000 cm$^3$/min., and the hose length to be 50 cm when the actuating oil pressure increases from 0 to 6 MPa, (10 cm$^3$/m)×0.5 m÷(2000 cm$^2$/60 seconds)=0.15 second.

This means that the time of 0.15 second is required before the actuating oil pressure rises to 6 MPa.

When the rising of the actuating oil pressure on the high pressure side of the control valve 6 becomes slow, the rising of the load of the electric motor 4 is also dulled through the hydraulic pump 5, thereby retarding the increase of the current led to the electric motor 4. Because of this, time is required from the manipulation of the steering wheel 7 to the increase by one step of the voltage to be applied to the electric motor 4 and the increase in the steering assisting force, so that there is a problem that the steering wheel catches in abrupt manipulation. This effect strongly appears especially when the delivery flow amount of the hydraulic pump 5 is set to be small, in a case where the output of the electric motor 4 is reduced so as to suppress energy consumption.

BRIEF SUMMARY OF THE INVENTION

The present invention has been done to settle the points as above. An object of the present invention is to provide a power steering apparatus which shows improved response to the steering assisting force and causes less catching in abrupt steering operation without being affected by the delay of the starting up of the actuating oil pressure which is generated due to swelling of the hose.

A power steering apparatus according to the present invention is characterized by comprising flow amount detecting means for detecting flow amount of actuating oil on the outlet side of an actuator using a hydraulic pump driven by a motor as a source for generation of actuating oil pressure, and control means for controlling the rotation of the motor so as to adjust the flow amount of the actuating oil to a predetermined flow amount.

The actuating oil flow amount includes the decrease content of the actuating oil flow amount caused by the swelling of a hose lying between the hydraulic pump and a control valve. The control means control the motor rotation so as to provide the predetermined actuating oil flow amount to offset this decrease. Consequently, the delay of starting up of the actuating oil which occurs due to the swelling of the hose can be compensated.

The apparatus may be additionally provided with a motor current detecting circuit for detecting the motor current that flows to the motor, and the control means may be provided with target determining means for determining a target value of the actuating oil flow amount based on the detected motor current and the target voltage proportionate to the target value, and voltage control means for controlling the target voltage so as to bring the actuating oil flow amount to the target value.

The voltage control means control by compensation the target voltage determined by the target determining means so that the actuating oil flow amount comes to the target value by offsetting the decrease of the actuating oil flow amount. As a result, the delay of the start-up of the actuating oil pressure generated by the swelling of the hose can be compensated.

A power steering apparatus according to the present invention is characterized by comprising flow amount variation detecting means for detecting variation amount of actuating oil flow amount on the exit side of an actuator and control means for controlling the rotation of a motor based on the variation amount.

The variation amount of the actuating oil flow amount includes the variation amount of the actuating oil flow amount caused by swell of a hose lying between a hydraulic pump and a control valve, and the control means control the motor rotation on the basis of said variation amount. Hense, the motor rotation can be controlled without being affected by the delay of the start-up of the actuating oil pressure caused by the swell of the hose, and the steering assisting response can be accelerated.

This control means act to increase the voltage to be applied to the motor for a predetermined duration when the variation of the actuating oil flow amount detected by the flow amount variation detecting means becomes larger than the predetermined value. And, the motor current increases by the start-up of the actuating oil pressure in the predetermined time to fill the conditions for maintaining the applied voltage to the motor to a high level. Even after lapse of the predetermined time, the steering assisting condition is continuously maintained. Therefore, without being affected by the delay of the start-up of the actuating oil pressure which occurs for the cause of the swelling of the hose, the voltage to be applied to the motor can be increased to assist steering action, and the steering assisting response can be accelerated. Above all, in case of the abrupt steering operation, because of the large variation of the actuating oil flow amount, response property can be improved.

Moreover, the apparatus may be further provided with a motor current detecting circuit for detecting the motor current which flows to the motor, so that the control means increase the applied voltage to the motor when the variation amount becomes larger than the predetermined value, and, under this condition, when the load is eliminated and the motor current is smaller than the predetermined value, the control means may decrease the applied voltage and release the steering assisting condition. By this construction, there can be obtained the effect that, in addition to the high speed response, at the stoppage of the steering the steering assisting condition can be immediately released. Especially, the response can be improved because the variation of the actuating oil flow amount is large at the abrupt steering operation.

Further, the control means may carry out the control to elevate the applied voltage to the motor on the basis of the predetermined time constant. In this way, the steering assisting force to be given to the steering wheel at the start of steering can be gradually increased, thereby reducing the shock to be exerted to the steering wheel.

Furthermore, the control means may be provided with target determining means for determining the target voltage on the basis of the motor current and voltage compensating means for compensating the target voltage so as to offset the variation amount of the actuating oil flow amount.

According to this power steering apparatus, in compensating the delay of the start-up of the actuating oil pressure caused by the swelling of the hose, the response can be accelerated.

The above and further objects and features of the invention will more fully be apparent from the following detailed description with accompanying drawings.

DETAILED DESCRIPTION OF THE INVENTION

Hereinafter, the present invention is described in detail with reference to the drawings showing the embodiment thereof.

Embodiment 1

Figure 4:
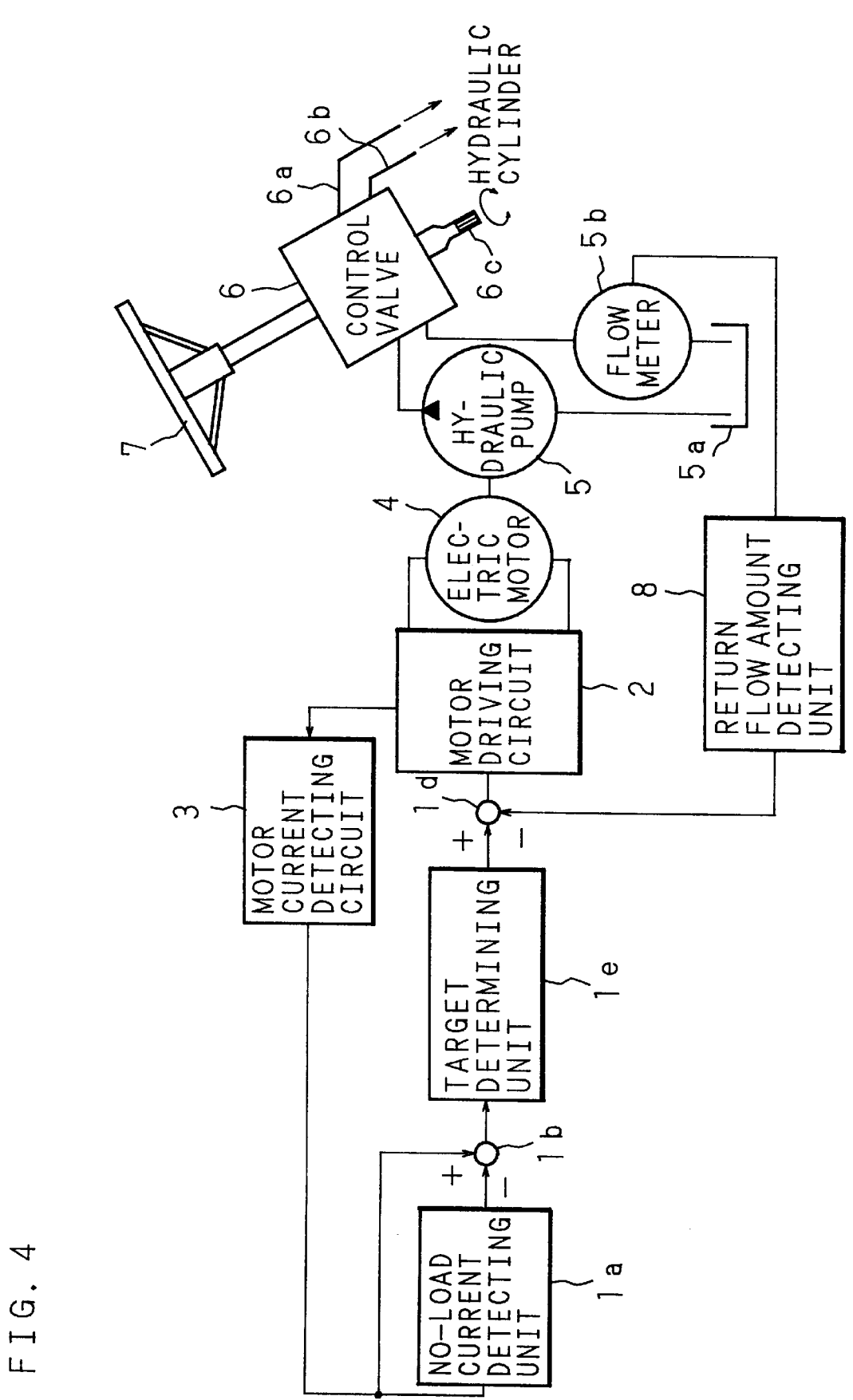
FIG. 4 is a block diagram showing a constitution of an essential part of a power steering apparatus of Embodiment 1.

FIG. 4 is a block diagram showing a constitution of an essential part of a power steering apparatus according to the first embodiment of the present invention. In this power steering apparatus, a target determining unit 1e outputs an indication signal of a voltage proportionate to a target flow amount of an actuating oil, and a motor driving circuit 2 applies a voltage to an electric motor 4 to drive it according to the indication signal. The electric motor 4 drives a hydraulic pump 5 by rotation to generate an actuating oil pressure. The control valve 6 controls a pressure of the actuating oil to be supplied under pressure to the pipelines 6a and 6b communicating with a hydraulic cylinder, corresponding to the actuating oil pressure.

When a steering wheel 7 is manipulated to operate a gear system including a pinion gear 6c provided at the lower end of a steering shaft, the control valve 6 controls the pressure of the actuating oil to be sent under pressure to the pipelines 6a and 6b communicating with the hydraulic cylinder. Hence, the hydraulic cylinder is actuated to generate the steering assisting force proportionate to the operation amount in the direction of operation of the steering wheel 7.

The actuating oil circulates through a hydraulic circuit constituted by the hydraulic pump 5, the control valve 6, the hydraulic cylinder and an oil feed tank 5a, and the like. The hydraulic circuit is provided on the exit side of the control valve 6 with a flow meter 5b for detecting a flow amount of the actuating oil returning to the oil feed tank 5a. The detection signal is given to a return flow amount detecting unit 8. The return flow amount detecting unit 8 converts the given detection signal to a signal representing the actuating oil flow amount to be returned to the oil feed tank 5a and outputs it to an operator 1d.

The motor driving circuit 2 is connected with a motor current detecting circuit 3 for detecting a current flowing in the electric motor 4. The resultant motor current detection signal is inputted to a no-load current detecting unit 1a and an operator 1b. The no-load current detecting unit 1a detects to hold the motor current detection signal at the time of no load in consideration of the motor current variable by the oil temperature. The operator 1b deducts the signal from the motor current detecting circuit 3 out of the signal from the no load current detecting part 1a and gives the variation amount of the motor current detection signal to the target determining unit 1e.

Figure 5:
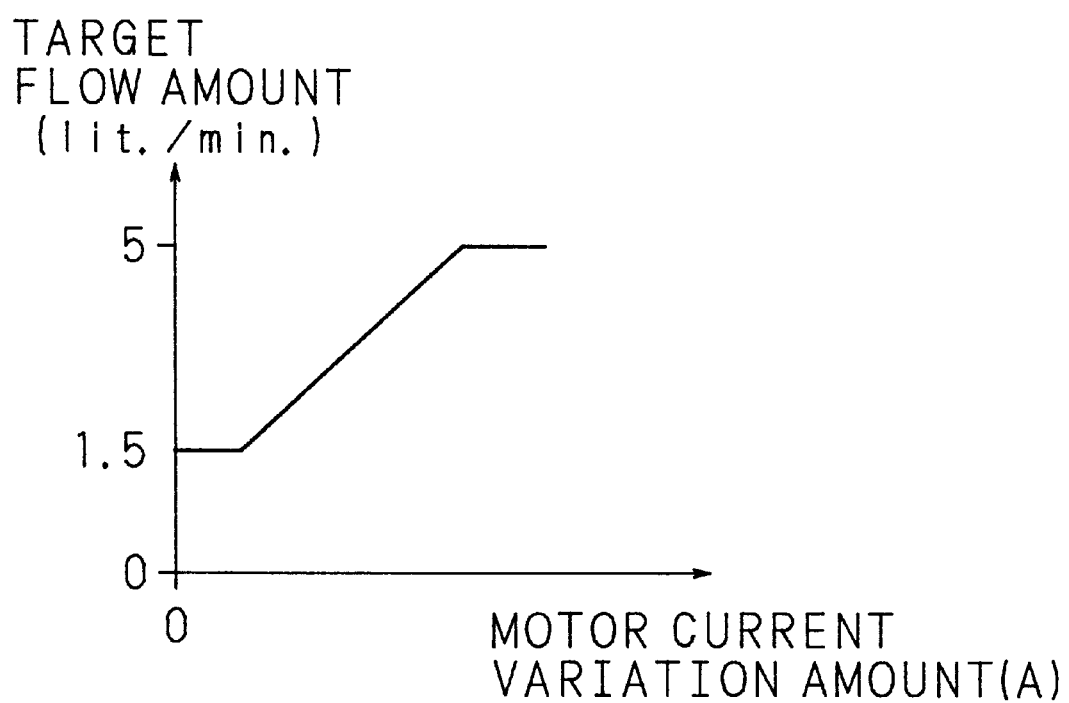
FIG. 5 is a view to show characteristics of a variation amount of a motor current and a target flow amount of actuating oil held by a target determining unit.

The target determining unit 1e has characteristics of the motor current variation amount and the target flow amount of the actuating oil as shown in FIG. 5, and it outputs to the operator 1d a voltage indication signal proportionate to the target flow amount of the actuating oil corresponding to the motor current represented by the signal given from the operator 1b.

The operator 1d deducts the signal representing the actuating oil flow amount returning to the oil feed tank 5a from the indication signal of the voltage proportionate to the target flow amount of the actuating oil, and gives the indication signal of the voltage of the difference thereof to the motor driving circuit 2. The motor driving circuit 2 drives the electric motor 4 by controlling the voltage to be applied thereto so as to make the actuating oil flow amount returning to the oil feed tank 5a the target flow amount, on the basis of the indication signal of the given difference voltage. The electric motor 4 drives in rotation the hydraulic pump 5 to generate the actuating oil flow amount.

In the power steering apparatus of such constitution, when the steering wheel 7 is not operated and no steering assistant force is required (the current flowing in the electric motor 4 is the current at the time of no load and is small), the target determining unit 1e lowers the voltage to be applied to the electric motor 4 to reduce the output of the electric motor 4, as shown in FIG. 5, so as to keep the target flow amount of the actuating oil which is a smaller constant amount, in order to suppress energy consumption.

On the other hand, when the steering wheel 7 is manipulated to operate the control valve 6, the actuating oil pressure rises to increase the load, and the current flowing in the electric motor 4 increases. When the variation amount of the motor current detection signal outputted by the operation 1b from the current at the time of no load increases from the predetermined amount, the target determining unit 1e sets the target flow amount of the actuating oil to the amount which gradually increases according to the variation amount of the motor current detection signal, as shown in FIG. 5. As a result, the voltage to be applied to the electric motor 4 is set to the value proportionate to the target flow amount of the actuating oil, and the output of the electric motor 4 is brought to the value corresponding to the target flow amount.

Further, when the current flowing in the electric motor 4 increases and the variation amount of the motor current detection signal from the current at the time of no load exceeds the predetermined value, the target determining unit 1e elevates the voltage to be applied to the electric motor 4 to increase the output of the electric motor 4, so as to keep the target flow amount of the actuating oil which is a larger constant value, as shown in FIG. 5.

Further, the flow meter 5b detects the flow amount of the actuating oil which returns to the oil feed tank 5a, and the resultant detection signal is given to the return flow amount detecting unit 8. The return flow amount detecting unit 8 converts the given detection signal to the signal representing the flow amount of the actuating oil which returns to the oil feed tank 5a and gives the resulting signal to the operator 1d.

The operator 1d subtracts the signal representing the flow amount of the actuating oil which returns to the oil feed tank 5a from the return flow amount detecting unit 8, from the indicating signal of the voltage to be applied to the electric motor 4 proportionate to the target flow amount, and gives the indication signal of the difference voltage to the motor driving circuit 2. The motor driving circuit 2 controls the voltage to be applied to the electric motor 4 so as to make the actuating oil flow returning to the oil feed tank 5a the target flow amount on the basis of the indication signal of the given difference voltage to drive the electric motor 4. The electric motor 4 drives in rotation the hydraulic pump 5, and the hydraulic pump 5 discharges the actuating oil amount proportionate to the voltage applied to the electric motor 4 to generate the actuating oil pressure.

By this construction, decrease in the flow amount of the actuating oil caused by the swelling of the hose from the hydraulic pump 5 to the control valve 6 can be prevented, and the delay of start-up of the actuating oil pressure can be dissolved.

Embodiment 2

Figure 6:
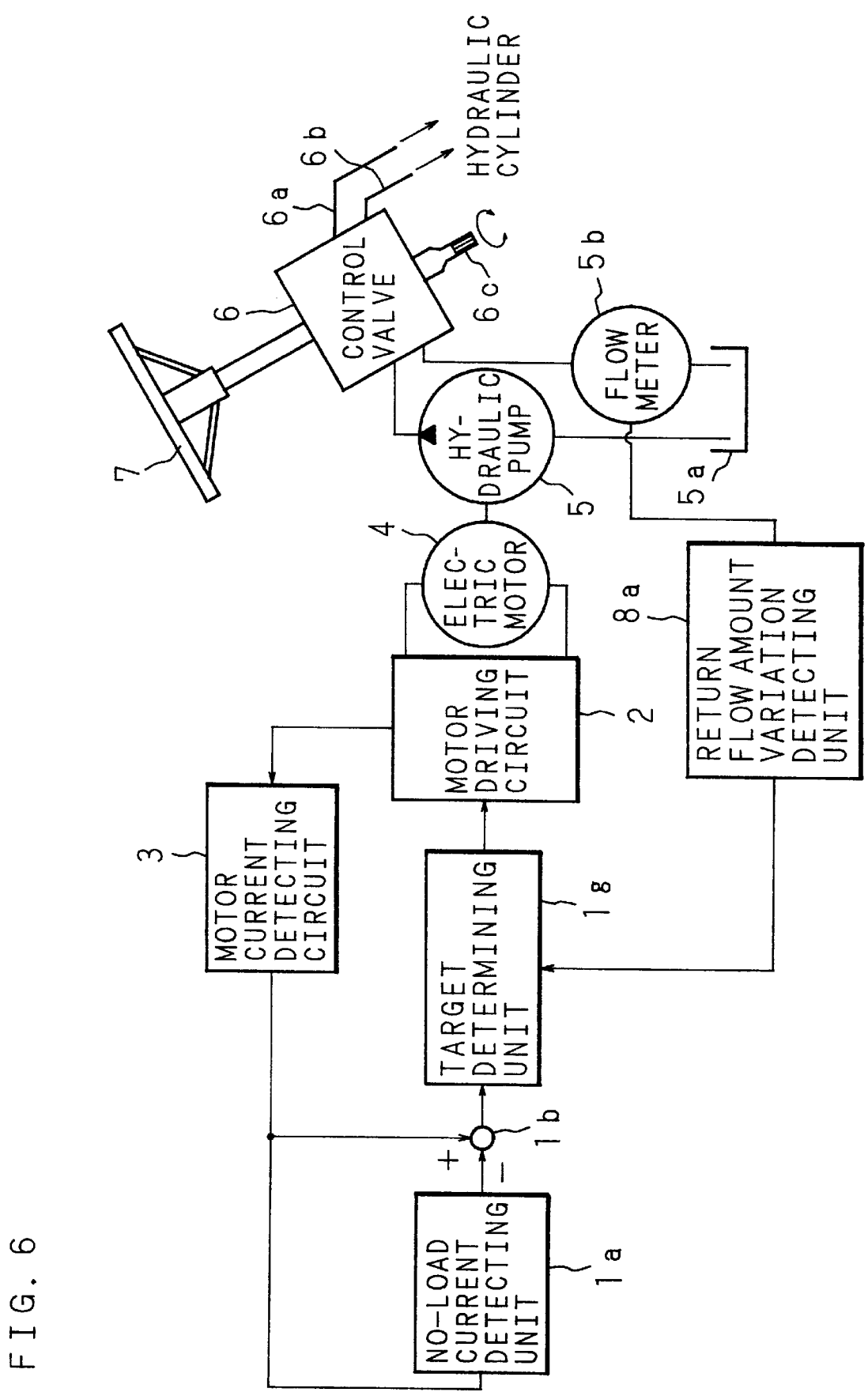
FIG. 6 is a block diagram showing a constitution of an essential part of a power steering apparatus according to Embodiments 2 and 3.

FIG. 6 is a block diagram showing a constitution of the essential part of a power steering apparatus according to the second embodiment of the present invention. In this power steering apparatus, a target determining unit 1g outputs an indication signal indicating the voltage to be applied to an electric motor 4 to a motor driving circuit 2. The motor driving circuit 2 applies a voltage to the electric motor 4 to drive it according to the indication signal. The electric motor 4 drives a hydraulic pump 5 by rotation to generate an actuating oil pressure. A control valve 6 controls the pressure of the actuating oil to be supplied under pressure to pipelines 6a and 6b communicate with a hydraulic cylinder under the actuating oil pressure.

The actuating oil circulates through a hydraulic circuit constituted by the hydraulic pump 5, the control valve 6, the hydraulic cylinder, an oil feed tank 5a, and the like. The hydraulic circuit is provided on the exit side of the control valve 6 with a flow meter 5b for detecting the flow amount of the actuating oil returning to the oil feed tank 5a. The detected signal is given to a return flow amount variation detecting unit 8a. The return flow amount variation detecting unit 8a prepares from the given detection signal a signal representing the variation amount of the actuating oil flow amount to return to the oil feed tank 5a and outputs it to the target determining unit 1g.

The motor driving circuit 2 is connected with a motor current detecting circuit 3 for detecting the current running to the electric motor 4. The resultant motor current detection signal is inputted to a no-load current detecting unit 1a and an operator 1b. The no-load current detecting unit 1a detects to hold the motor current detection signal at the time of no load in consideration of the motor current variable by the oil temperature. The operator 1b subtracts the signal outputted by the motor current detecting circuit 3 from the signal outputted by the no load current detecting unit 1a and gives the variation amount of the motor current detection signal to the target determining unit 1g.

Figure 1:
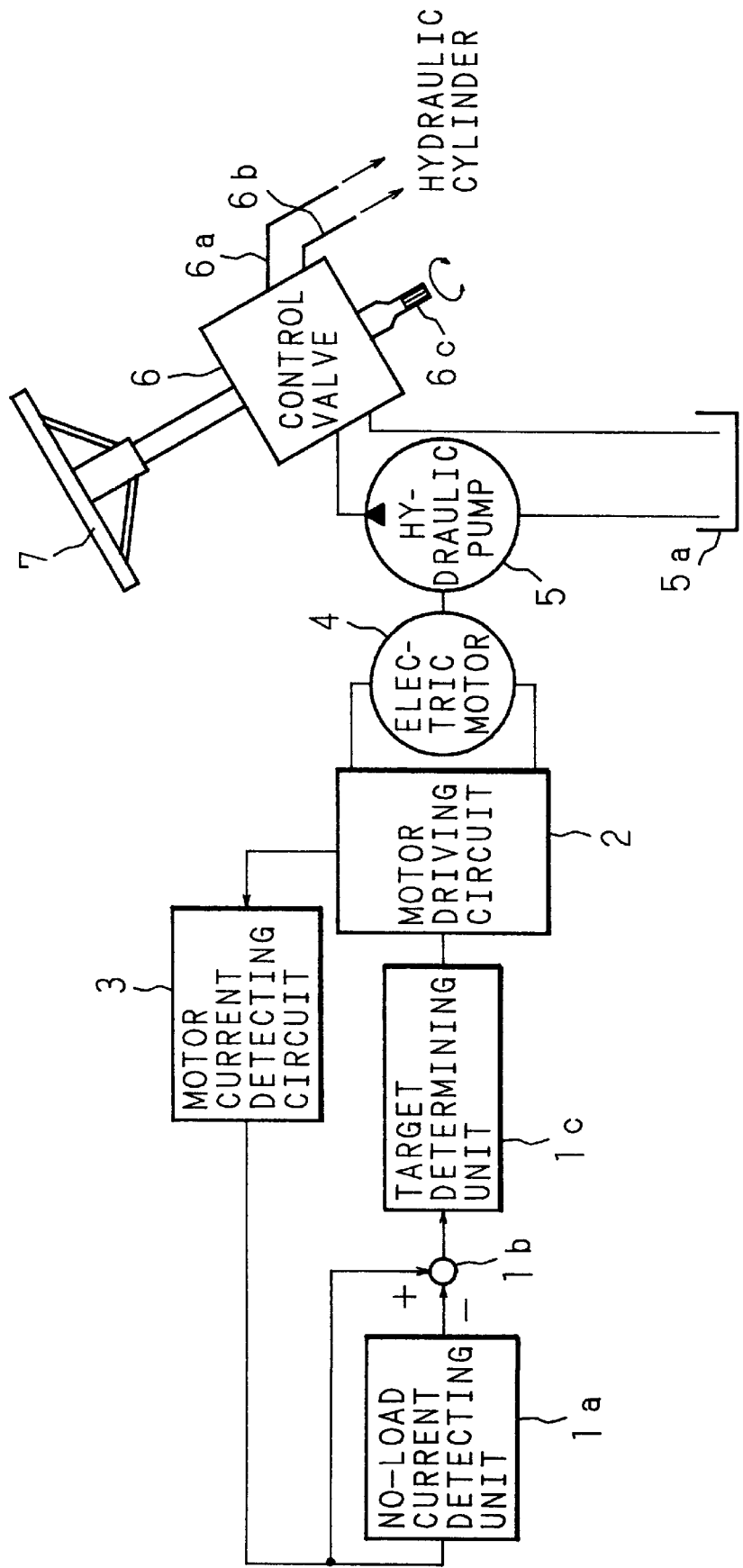
FIG. 1 is a block diagram showing a constitution of a main portion of a conventional power steering apparatus.
Figure 2:
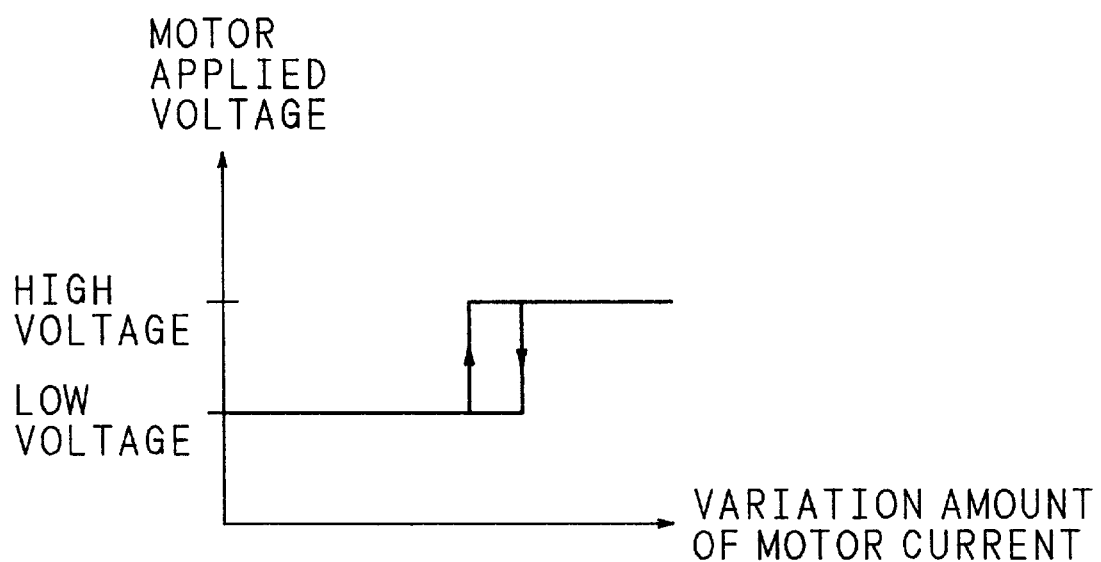
FIG. 2 is a view to show characteristics of variation amount of a motor current detection signal and a voltage to be applied to the electric motor, held by a characteristic determining unit.
Figure 3A:
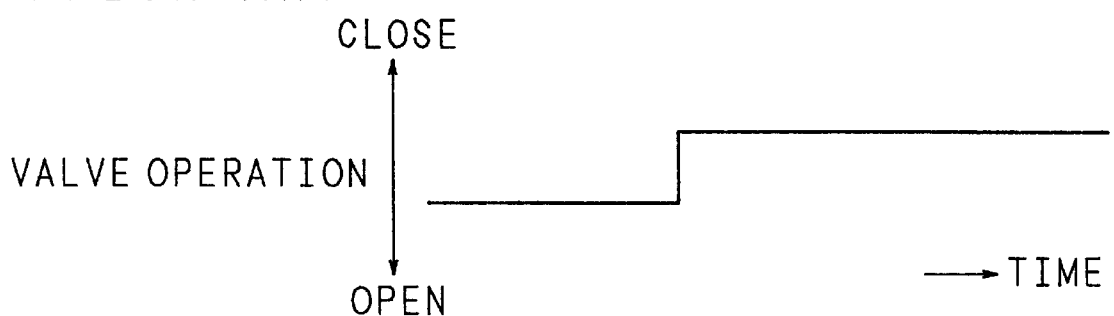
FIG. 3A is a timing chart for illustrating value operation of the conventional power steering apparatus.
Figure 3B:
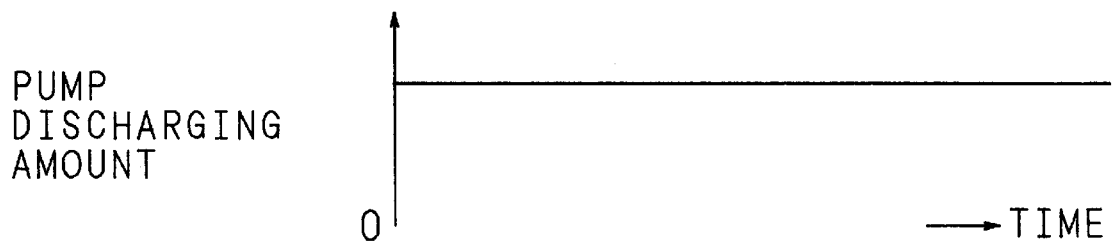
FIG. 3B is a timing chart for illustrating a pump discharging amount in the conventional power steering apparatus.
Figure 3C:
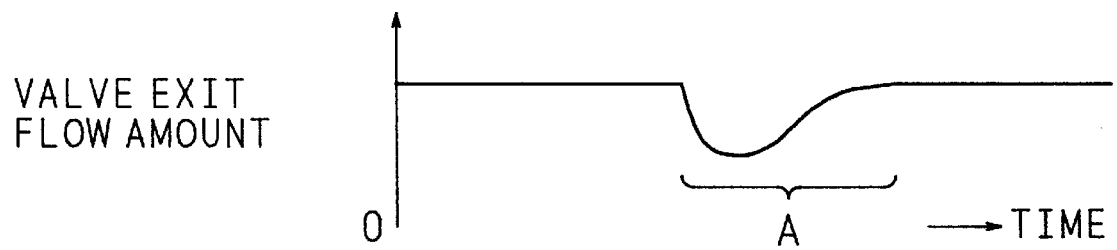
FIG. 3C is a timing chart for illustrating a value exit flow amount in the conventional power steering apparatus.
Figure 3D:
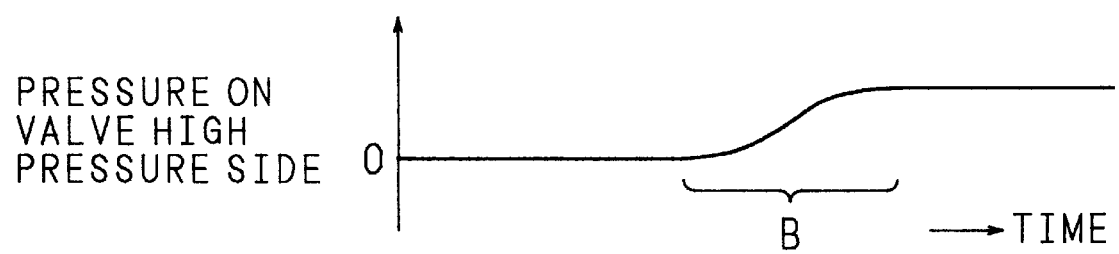
FIG. 3D is a timing chart for illustrating a pressure on valve high pressure side in the conventional power steering apparatus.

The target determining unit 1g controls the voltage to be applied to the electric motor 4 by switching to high and low levels according to the motor current variation amount, as shown in FIG. 2, and it gives the voltage indication signal to the motor driving circuit 2. Also, when the variation amount of the actuating oil flow amount returning to the oil feed tank 5a given by the return flow amount variation detecting unit 8a exceeds the predetermined value, the target determining unit 1g controls the voltage to be applied to the electric motor 4 by switching to a high voltage in accordance with the predetermined time constant to keep this high voltage, for instance for one second. In this case, if the motor driving circuit 2 is a circuit to carry out PWM (Pulse Width Modulation) control, its duty factor is increased to 100% in a predetermined time, and the 100% value is maintained for example for one second.

As other points of constitution are the same as those of the power steering apparatus given in the foregoing Embodiment 1, explanation is omitted.

In the power steering apparatus of such a constitution, when the steering wheel 7 is not in operation and does not require steering assistant force (the current flowing in the electric motor 4 is that of no load time and small), in order to suppress energy consumption, the target determining unit 1g operates to keep the voltage to be applied to the electric motor 4 at a constant low level to decrease the output of the electric motor 4, as shown in FIG. 2.

When the steering wheel 7 is abruptly manipulated to operate abruptly the control valve 6, by which the actuating oil pressure starts to rise sharply and the hose lying between the hydraulic pump 5 and the control valve 6 suddenly swells, the flow amount of the actuating oil returning to the oil feed tank 5a suddenly decreases to show large variation amount. When the variation amount exceeds the predetermined level, the target determining unit 1g effects selective control of the voltage to be applied to the electric motor 4 to a high voltage in accordance with the predetermined time constant, and keeps the high voltage for example for one second.

On the other hand, due to the abrupt swelling of the hose lying between the hydraulic pump 5 and the control valve 6, the actuating oil pressure rises accordingly, though with certain delay, to increase the load and increase the current flowing in the electric motor 4. And, when the variation amount of the motor current detection signal from the no load time current outputted by the operator 1b exceeds the predetermined amount, the target determining unit 1g increases the voltage to be applied to the electric motor 4 to keep it constant to enlarge the output of the electric motor 4, as shown in FIG. 2.

Accordingly, if the time for the target determining unit 1g to keep a high voltage (for example, 1 second) is set to be longer than the delay (for example, 0.2 second) of the actuating oil pressure resulting from the swelling of the hose lying between the hydraulic pump 5 and the control valve 6, the variation amount of the actuating oil flow amount becomes larger than the predetermined value, so that it is possible for the target determining part 1g to effect control of switching the voltage to be applied to the electric motor 4 to a high voltage, and continuously to keep the voltage to be applied to the electric motor 4 high so as to continue the steering assistant condition.

Thus, without being affected by the delay of start-up of the actuating oil pressure which occurs for the cause of the abrupt swell of the hose between the hydraulic pump 5 and the control valve 6 at the time of the abrupt steering, the applied voltage to the electric motor can be elevated to assist steering operation, and the response to steering assistance in abrupt steering operation can be accelerated. Also, when the steering operation is performed slowly and the variation amount of the actuating oil flow amount does not exceed the predetermined amount, the variation amount of the motor current detection signal from the current at the time of no load can exceed the predetermined amount, whereupon the target determining unit 1g can elevate the voltage to be applied to the electric motor 4 to assist steering, as shown in FIG. 2. As other operations are the same as those of the power steering apparatus of the foregoing embodiment 1, explanation is omitted.

Embodiment 3

A constitution of an essential part of a power steering apparatus according to an embodiment 3 of the present invention is approximately the same as that of the power steering apparatus according to the embodiment 2 as shown in FIG. 6 above. In the power steering apparatus of embodiment 3, the target determining unit 1g controls the voltage to be applied to the electric motor 4 by switching to high and low levels according to the variation amount of the motor current, as shown in FIG. 2.

When the variation amount of the actuating oil flow amount returning to the oil feed tank 5a, given from the return flow amount variation detecting unit 8a, exceeds the predetermined value, the target determining unit 1g controls the voltage to be applied to the electric motor 4 by switching to the high voltage, in accordance with the predetermined time constant, and, with this high voltage kept, it provides a steering assisting condition. And, after once switched to the high voltage, as shown in FIG. 2, it keeps on the steering assisting condition until the variation amount of the motor current becomes smaller than the predetermined value, without changing over to the low voltage, and when the variation amount of the motor current becomes smaller than the predetermined value, it switches over to the low voltage and releases the steering assisting condition.

At this time, if the motor driving circuit 2 is a circuit to carry out PWM (Pulse Width Modulation) control, then the duty factor is increased to 100% in a predetermined time to keep said 100% condition. As other conditions are the same as the constitution of the power steering apparatus relating to the embodiment 2 above, explanation is omitted.

In the power steering apparatus of the constitution as above, when the steering wheel 7 is not operated and no steering assisting force is required (the current flowing in the electric motor 4 is the current at the time of no load and is small), the target determining unit 1g lowers the voltage to be applied to the electric motor 4 to keep it constant, as shown in FIG. 2, so as to suppress energy consumption, thereby reducing the output of the electric motor 4.

When the steering wheel 7 is abruptly manipulated to operate abruptly the control valve 6, by which the actuating oil pressure starts to rise sharply and the hose lying between the hydraulic pump 5 and the control valve 6 suddenly swells, the flow amount of the actuating oil returning to the oil feed tank 5a suddenly decreases to show large variation amount. When the variation amount exceeds the predetermined level, the target determining unit 1g effects selective control of the voltage to be applied to the electric motor 4 to a high voltage on the basis of the predetermined time constant, and keeps the high voltage to provide a steering assisting condition. And, after the voltage is once changed to a high voltage, as shown in FIG. 2, the steering condition is continued without changing over to the low voltage. When the variation amount of the motor current becomes smaller than the predetermined value, the condition is switched over to the low voltage to release the steering assisting condition.

Thus, without being affected by the delay of start-up of the actuating oil pressure which occurs with the abrupt swelling of the hose between the hydraulic pump 5 and the control valve 6 at the time of the abrupt steering, the applied voltage to the electric motor can be elevated to assist steering operation, and the response to steering assistance in abrupt steering operation can be accelerated. Also, when the steering operation is performed slowly and the variation amount of the actuating oil flow amount does not exceed the predetermined amount, the variation amount of the motor current detection signal from the current at the time of no load can exceed the predetermined value, whereupon the target determining unit 1g can elevate the voltage to be applied to the electric motor 4 to the high voltage to assist steering, as shown in FIG. 2.

As other operations are the same as the operations of the power steering apparatus of the foregoing embodiment 1, explanation is omitted.

Embodiment 4

Figure 7:
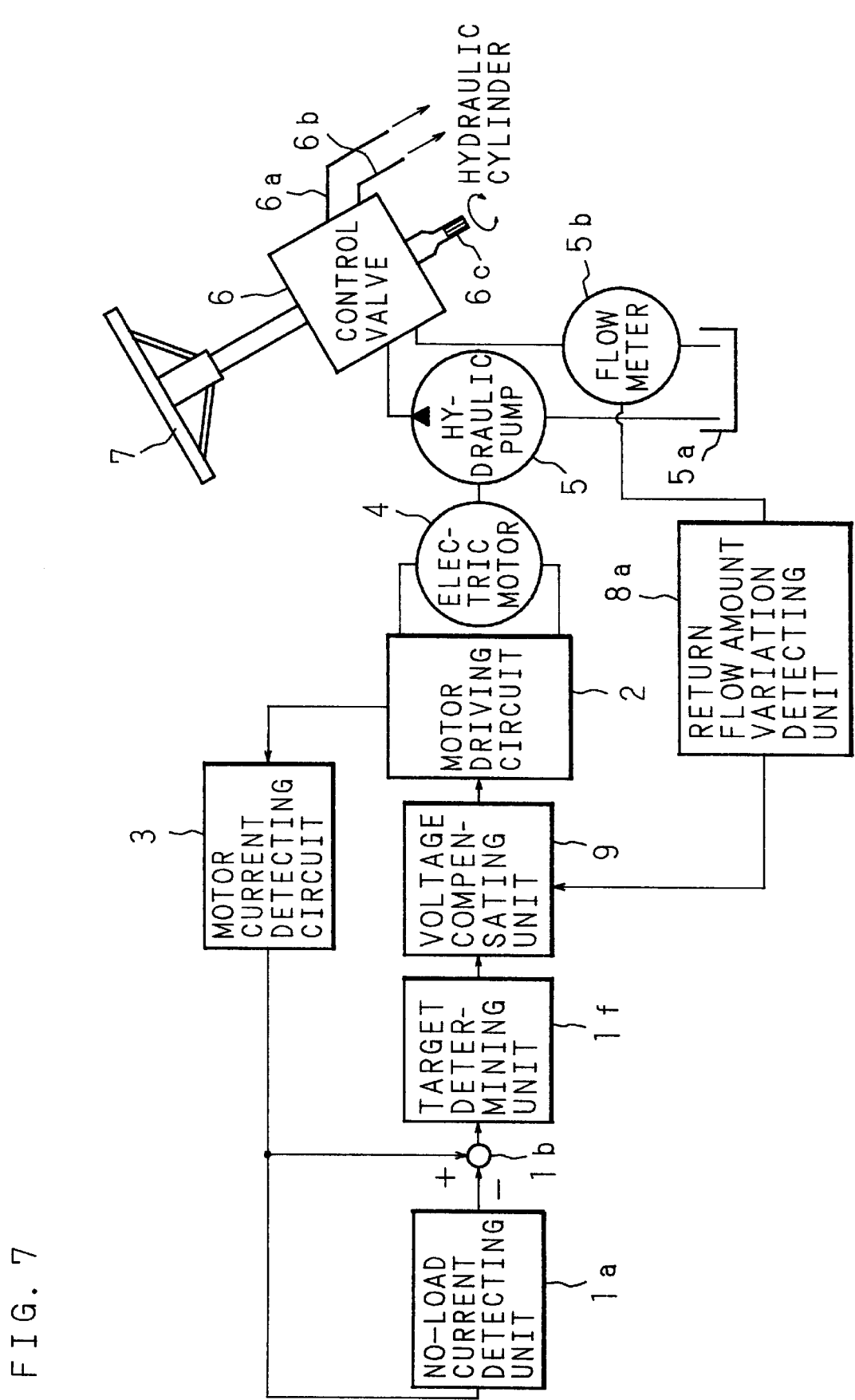
FIG. 7 is a block diagram showing a constitution of an essential part of a power steering apparatus of Embodiment 4.

FIG. 7 is a block diagram showing a constitution of an essential part of a power steering apparatus of an embodiment 4 of the present invention. In this power steering apparatus, a target determining unit 1f outputs an indication signal indicating a voltage to be applied to an electric motor 4. This indication signal is compensated at a voltage compensating part 9 and given to a motor driving circuit 2. The motor driving circuit 2 applies a voltage to the electric motor 4 in accordance with the compensated indication signal to drive the motor. The electric motor 4 rotationally drives a hydraulic pump 5 to generate an actuating oil pressure. The control valve 6 controls a pressure of the actuating oil to be sent under pressure to pipelines 6a and 6b led to a hydraulic cylinder on the basis of the actuating oil pressure.

The actuating oil circulates a hydraulic circuit constituted by the hydraulic pump 5, the control valve 6, the hydraulic cylinder, an oil feed tank 5a, and the like. In the hydraulic circuit there is provided, on the exit side of the control valve 6, a flow meter 5b for detecting the actuating oil flow amount returning to the oil feed tank 5a, and resultant detection signal is given to a return flow amount variation detecting unit 8a. The return flow amount variation detecting unit 8a prepares from the given detection signal a signal to represent the variation amount of the actuating oil flow amount returning to the oil feed tank 5a and outputs it to the voltage compensating unit 9.

The motor driving circuit 2 is connected with the motor current detecting circuit 3 for detecting the current running to the electric motor 4. The motor current detection signal is inputted to a no-load current detecting unit 1a and an operator 1b. The no-load current detecting unit 1a detects to hold the motor current detection signal at the time of no load in consideration of the motor current variable by the oil temperature. The operator 1b subtracts the signal outputted by the motor current detecting circuit 3 from the signal outputted by the no load current detecting unit 1a and gives the variation amount of the motor current detection signal to the target determining unit 1f. The target determining part 1f is to control the voltage to be applied to the electric motor 4 by switching it to high and low levels according to the motor current variation amount, as shown in FIG. 2, and it gives the voltage indication signal to the voltage compensating part 9.

The voltage compensating part 9 compensates the voltage indication signal in a manner to offset the variation amount of the actuating oil flow amount returning to the oil feed tank 5a given from the return flow amount variation detecting unit 8a on the basis of the signal representing the variation amount, and outputs the indication signal of the compensated voltage. As other points of constitution are the same as those of the power steering apparatus given in the foregoing embodiment 1, explanation is omitted.

In the power steering apparatus of the constitution as above, when the steering wheel 7 is not operated and no steering assisting force is required (the current flowing in the electric motor 4 is the current at the time of no load and is small), the target determining unit 1f lowers the voltage to be applied to the electric motor 4 to keep it constant, as shown in FIG. 2, so as to suppress energy consumption, thereby reducing the output of the electric motor 4.

On the other hand, when the steering wheel 7 is manipulated to operate the control valve 6, the actuating oil pressure rises to increase the load, and the current flowing in the electric motor 4 increases. When the variation amount of the motor current detection signal from the current at no load outputted by the operator 1b exceeds the predetermined level, the target determining part 1f increases the voltage to be applied to the electric motor 4 to a constant level and increases the output of the electric motor 4.

Also, the flow meter 5b detects the amount of the actuating oil returning to the oil feed tank 5a, and the detection signal thereof is given to the return flow amount variation detecting unit 8a. The return flow amount variation detecting unit 8a prepares a signal to represent the variation amount of the actuating oil flow amount returning to the oil feed tank 5a and outputs it to the voltage compensating unit 9.

The voltage compensating unit 9 compensates the voltage indication signal in good adaptability in a manner to offset the variation amount of the actuating oil flow amount returning to the oil feed tank 5a given from the return flow amount variation detecting part 8a on the basis of the signal representing the variation amount, and outputs the indication signal of the compensated voltage to the motor driving circuit 2. The voltage compensating part 9 compensates, for example, when the actuating oil flow amount decreases by the swelling of the hose from the hydraulic pump 5 to the control valve 6, to increase the voltage to be applied to the electric motor 4 so as not to decrease the actuating oil flow amount.

The motor driving circuit 2 controls, in accordance with the given voltage indication signal, the voltage to be applied to the electric motor 4 to drive the electric motor 4 so as not to cause decrease of the actuating oil flow amount returning to the oil feed tank 5a. The electric motor 4 drives in rotation the hydraulic pump 5, and the hydraulic pump 5 discharges the actuating oil of amount proportionate to the voltage to be applied to the electric motor 4 to generate the actuating oil pressure.

By the above construction, decrease of the actuating oil flow amount by swelling of the hose from the hydraulic pump 5 to the control valve 6 can be prevented, and delay of rising of actuating oil pressure can be dissolved.

As this invention may be embodied in several form without departing from the spirit of essential characteristics thereof, the present embodiments are therefore illustrative and not restrictive, since the scope of the invention is defined by the appended claim rather than by the description preceding them, and all changes that fall within metes and bounds of the claims, or equivalence of such metes and bounds thereof are therefore intended to be embraced by the claims.

I claim:

1. A power steering apparatus comprising:

an electric motor;

a hydraulic pump driven by said motor;

an actuator charging and discharging actuating oil sent under pressure by said hydraulic pump so as to generate a steering assisting force;

a flow detector detecting the actuating oil flow amount exiting said actuator;

a hose between said hydraulic pump and said actuator of a material which expands as the pressure of the oil supplied to said actuator by said pump increases; and a controller responsive to the detected flow amount controlling the rotation of said motor so as to make the actuating oil flow amount supplied by said pump a predetermined amount such as to compensate for the actuating oil flow amount decrease caused by the expansion of said hose.

2. A power steering apparatus according to claim 1, further comprising a motor current detecting circuit detecting current flowing in said motor, wherein said controller includes:

a targeting controller determining a target value of the actuating oil flow amount based on the detected motor current flow and a target voltage corresponding to the target value; and a voltage controller providing said motor with the target voltage at a value such that the actuating oil flow amount detected by said flow amount detecting means corresponds to the target value.

3. A power steering apparatus comprising:

an electric motor;

a hydraulic pump driven by said motor;

an actuator charging and discharging actuating oil sent under pressure by said hydraulic pump so as to generate a steering assisting force;

a flow amount variation detector detecting the variation in the amount of the actuating oil exiting said actuator, a hose between said hydraulic pump and said actuator of a material which expands as the pressure of the oil supplied to said actuator by said pump increases; and a controller controlling the rotation of the motor in relationship to said detected variation amount for controlling the actuating oil flow amount supplied by said pump by an amount to compensate for the actuating oil flow amount decrease caused by the expansion of said hose.

4. A power steering apparatus according to claim 3, wherein said controller increases a voltage applied to said motor for a predetermined duration when the detected variation amount exceeds a predetermined value.

5. A power steering apparatus according to claim 3, further comprising a motor current detecting circuit for detecting current flowing in said motor, wherein said controller increases the voltage applied to said motor when the detected variation amount exceeds a predetermined value and lowers the applied voltage when the motor current detected by said motor current detecting circuit becomes smaller than a predetermined value.

6. A power steering apparatus according to claim 1, wherein said controller increases the applied voltage to said motor in accordance with a predetermined time constant.

7. A power steering apparatus according to claim 5, wherein said controller increases the applied voltage to said motor on the basis of a predetermined time constant.

8. A power steering apparatus according to claim 3, further comprising a motor current detecting circuit for detecting current flowing in said motor, wherein said controller includes:

a targeting controller determining a target voltage on the basis of the detected motor current; and a voltage compensator for compensating the target voltage so as to offset the variation amount.

* * * * *